H. H. Lom,
Sawing Shingles.
No. 2,184. Reissued Mar. 6, 1866.
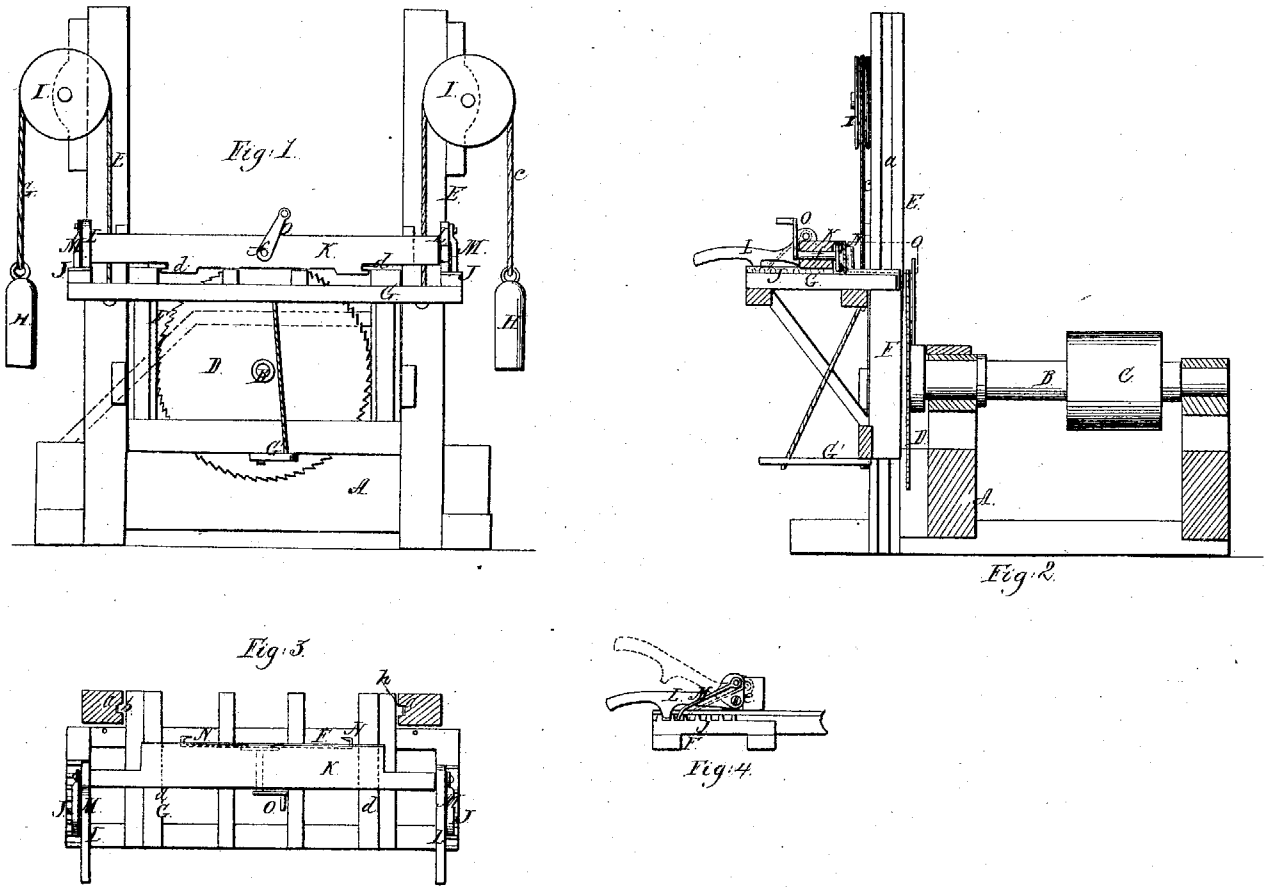
AM. PHOTO-LITHO. CO. N. Y. (OSBORNE'S PROCESS.)

UNITED STATES PATENT OFFICE.

CHARLES S. BURT, OF DUNLEITH, ILLINOIS, ASSIGNEE BY MESNE ASSIGNMENTS, OF H. H. LOW.

IMPROVEMENT IN SHINGLE-MACHINES.

Specification forming part of Letters Patent No. 19,644, dated March 16, 1858; Reissue No. 2,184, dated March 6, 1866.

*To all whom it may concern:*

Be it known that H. H. LOW, formerly of Galena, Jo Daviess county, State of Illinois, but now deceased, did invent in his life-time a new and Improved Sawing-Machine, for which Letters Patent No. 19,644 were granted to him March 16, 1858; and I, CHARLES S. BURT, of Dunleith, Jo Daviess county, State of Illinois, assignee in full of said invention and patent, do hereby declare that the following is a full, clear, and exact description thereof, reference being had to the accompanying drawings, making a part of this specification, in which—

Figure 1 is a front elevation of the machine complete. Fig. 2 is a transverse section taken in a vertical plane through the center of the machine. Fig. 3 is a detached plan view of the bolt-table and head-block. Fig. 4 is a detached end view of the bolt-table and head-block.

Similar letters of reference indicate corresponding parts in the several figures.

The object of this invention is to employ a vertically-adjustable bolt-frame or table, which is sustained by a counter-weight, so that it can be readily moved up or down alongside of a circular saw, and to provide such a frame with an adjustable head-block which can be moved up to or from the saw at pleasure for the purpose of sawing straight slabs or oblique shingles from bolts, as will be hereinafter described.

The invention also provides for counterbalancing the bolt-frame in such manner that after it has been depressed and a slab or shingle cut from the bolt this frame will, on being released by the attendant, rise automatically to a position which will admit of the bolt being adjusted for another cut, as will be hereinafter described.

To enable others skilled in the art to understand this invention, I will describe its construction and operation.

In the accompanying drawings, A represents a frame which may be constructed in any suitable manner, and B represents an arbor or shaft, which is arranged horizontally upon said frame so as to turn freely in suitable bearings thereon. On the arbor B a belt-drum, C, is keyed for receiving motion from any convenient motor. There is also secured on one end of said arbor a circular saw, D, as shown in Figs. 1 and 2.

To the end of the arbor-frame A, and nearly in the same vertical plane as the saw D, there are two stationary uprights, E E, which are located at the sides of said frame. These uprights are grooved vertically on their inner sides, as shown at *a*, and a frame or gate, F, is fitted between the said uprights which has tenon-guides, *b b*, at its ends, which fit into the grooves *a a* and slide freely therein when the gate is moved up and down. To the upper part of the gate F a horizontal frame, G, is secured for supporting an adjustable bolt-head or head-block K. The gate and frame are counterbalanced by weights H H, which are attached to cords or chains *c c*, that pass over pulleys I I, which are pivoted to the uprights E E, near the upper ends thereof. The cords or chains *c c* are carried down from said pulleys and connected to the bolt-frame or gate F, as shown in Fig. 1. To the lower part of the gate F a treadle, G′, is suitably attached, by means of which the attendant can, with his foot, depress the gate F.

J J are two racks which are secured to the upper surface of the frame G, one rack at each end thereof, and K is a head-block which is placed longitudinally on the frame G, and fitted to and allowed to slide between transverse guides or ways *d d*, on the frame, as shown clearly in Fig. 1. To each end of the head-block K a lever, L, is pivoted, and to each lever near its pivot *e* a pawl, M, is attached, said pawls catching into the racks J J, as shown in Figs. 1, 2, and 4.

To the inner side of the head-block K two dogs, N N, are attached, which are connected to a shaft, *f*, that passes transversely through the head-block, and has a lever, O, attached to its outer end. The operation is as follows: The bolt (shown in red, Fig. 2) is secured to the head-block K by the clamping-dogs N N, and the weights H H are sufficiently heavy to keep the frame G elevated and the bolt above the saw when the foot of the operator is not on the treadle.

The operator, by depressing the treadle G′ with his foot, forces down the gate F and frame G, and the bolt is thereby fed down to the saw D, which is rotated, as before mentioned. When the saw has cut off a slab from the bolt, the operator removes his foot from the treadle, and the weights H H raise the frame G, so that the bolt will be returned to a position above the saw. When the frame G reaches its highest point, it is stopped by projections on the uprights E E, and the bolt can be adjusted by operating the levers L L. If both of these levers are operated simultaneously, the bolt-head K with its bolt will be moved bodily toward the saw, and the stuff will be sawed from the bolt with parallel sides. In case shingles, or other stuff having tapering sides, are to be sawed, each lever L is operated alternately after the frame G has ascended to a position which will clear the bolt of the highest part of the saw, so that the bolt will thus be presented obliquely to the saw.

If desirable, the bolt-frame may be arranged beneath the saw, instead of above it, as shown, so that the bolts will be cut by the saw as the frame G rises. Such an arrangement would not alter in the least the principle of this invention, provided the feature of hanging and balancing said frame herein described is preserved.

The device for clamping the bolt to the head-block, and the contrivances for adjusting the head-block up to and from the saw may be substituted by any of the well-known contrivances used for a similar purpose in sawing machinery. It is not, therefore, intended to confine this invention to such devices.

One great advantage of this invention over machines which have hitherto been employed for sawing blocks is that when the bolt-table is released by the operator it will be moved quickly to a position above the saw, which will admit of the adjustment of the bolt for another cut, and while this is the case, the elevation of said table is effected, without the expenditure of power on the part of the attendant, by the counterbalancing weights.

I am aware of the patent of George Crane, dated September 23, 1856, and also of the patent of J. Creager, dated April 14, 1857, for sawing-machines, and therefore I do not claim a horizontally-moving carriage mounted upon horizontal rails and acted upon by weights, nor a stationary bed in combination with a circular saw which rises and falls, being acted upon by weights or levers.

This machine is a great improvement over the arrangement which employs a horizontal carriage and bed, both in simplicity of construction and the ease with which it is operated. It is far preferable to the plan which employs a vertically-moving saw, for the reason that it obviates the great difficulty of keeping the band which drives the saw taut at all times during the traverse of the saw up and down; also, the difficulty of keeping the band out of the way of the shingles and frame of the machine; also, because it obviates the great weight necessary to make saw-frames heavy enough to prevent jar—when they are thus made heavy enough for this purpose the weight of saw and mandrel cannot be operated as or nearly as fast as my light sash or bolt gate; also, because with a movable saw-frame there is danger of throwing the blocks from the dogs, owing to the saw sawing from the top of the machine; also, because my head-blocks, sash, and the bolt can be moved together, and the operator from his position can readily operate the sash and also the feeding devices; and finally, because with the balanced vertically-moving bolt-gate the machine can be more substantially built, operated to do better quality and greater quantity of work with less power and with greater convenience.

I do not claim separately any of the parts described.

Having thus described the invention of H. H. Low, what I claim as new, and desire to secure by Letters Patent, is—

1. A vertically-movable and counterbalanced bolt gate or frame, G, in combination with a circular saw, D, which is arranged in a fixed frame and operating substantially as described.

2. Providing a vertically-moving counterbalanced bolt frame or gate, G, with a head-block, K, and contrivance for adjusting said block up to and from the saw, when constructed substantially as described.

3. So constructing a machine for sawing, tapering, or straight slabs from bolts that the table or frame upon which the bolts are secured shall be automatically returned by an upward movement or a downward movement to a position which will admit of the adjustment of the bolt after each cut, by the means substantially as described.

4. The combination of the vertically-movable counterbalanced gate and treadle with the head-block K, levers L, pawls M, and racks J, arranged and operating substantially as described.

CHAS. S. BURT.

Witnesses:
JAMES GARRICK,
A. SWITZER.